US011370024B2

(12) United States Patent
Morsi et al.

(10) Patent No.: US 11,370,024 B2
(45) Date of Patent: Jun. 28, 2022

(54) CURRENT ACTIVATED TIP-BASED SINTERING (CATS)

(71) Applicant: SAN DIEGO STATE UNIVERSITY RESEARCH FOUNDATION, San Diego, CA (US)

(72) Inventors: Khaled Morsi, San Diego, CA (US); Kee Moon, San Diego, CA (US)

(73) Assignee: SAN DIEGO STATE UNIVERSITY RESEARCH FOUNDATION, San Diego, CA (US)

( * ) Notice: Subject to any disclaimer, the term of this patent is extended or adjusted under 35 U.S.C. 154(b) by 0 days.

(21) Appl. No.: 14/020,189

(22) Filed: Sep. 6, 2013

(65) Prior Publication Data

US 2018/0161871 A1    Jun. 14, 2018

(51) Int. Cl.
| | | |
|---|---|---|
| *B22F 3/105* | (2006.01) | |
| *C03C 1/00* | (2006.01) | |
| *C04B 35/52* | (2006.01) | |
| *B22F 10/20* | (2021.01) | |
| *B22F 3/10* | (2006.01) | |
| *B33Y 10/00* | (2015.01) | |
| *B28B 1/00* | (2006.01) | |
| *B22F 1/054* | (2022.01) | |

(52) U.S. Cl.
CPC ............. *B22F 3/105* (2013.01); *B22F 10/20* (2021.01); *C03C 1/00* (2013.01); *C04B 35/52* (2013.01); *B22F 1/054* (2022.01); *B22F 3/1007* (2013.01); *B22F 2003/1051* (2013.01); *B28B 1/001* (2013.01); *B33Y 10/00* (2014.12); *C04B 2235/6026* (2013.01); *C04B 2235/666* (2013.01); *C04B 2235/94* (2013.01)

(58) Field of Classification Search
CPC ......... B22F 3/1055; B22F 10/00; B22F 10/20
See application file for complete search history.

(56) References Cited

U.S. PATENT DOCUMENTS

| | | | | |
|---|---|---|---|---|
| 3,241,956 A | * | 3/1966 | Inoue ...................... | B22F 3/105 419/52 |
| 5,641,391 A | * | 6/1997 | Hunter ..................... | C25D 5/02 205/672 |
| 2004/0251581 A1 | * | 12/2004 | Jang ....................... | B29C 64/112 700/98 |
| 2007/0122562 A1 | * | 5/2007 | Adams ..................... | H05H 1/42 427/532 |
| 2011/0262655 A1 | * | 10/2011 | Morsi ..................... | B22F 3/1055 427/532 |

OTHER PUBLICATIONS

Paul Johnson, "Furnace Atmospheres," ASM Handbook, vol. 4 (1991) pp. 542-567.*

* cited by examiner

*Primary Examiner* — Christopher S Kessler

(74) *Attorney, Agent, or Firm* — Juneau & Mitchell; Todd L. Juneau

(57) ABSTRACT

The invention relates to a product and a process for fabricating a 1D, 2D, or 3D layered micro or nano component that comprises providing an electrode having a micro-scale or nano-scale tip, and applying electric current to the electrode tip in the presence of a micro-scale or nano-scale powder.

14 Claims, 4 Drawing Sheets

A schematic representation of Claim 1

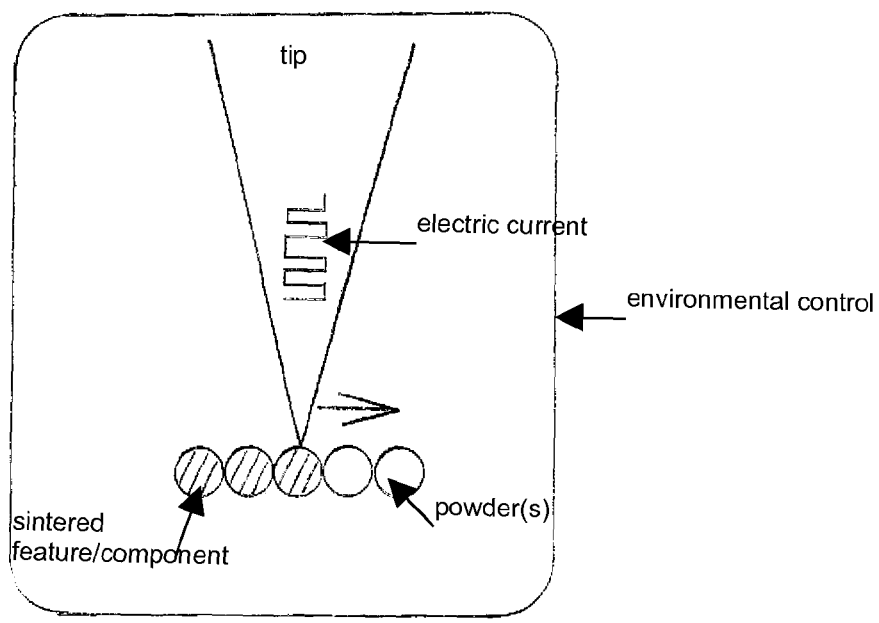
Fig. 1: A schematic representation of Claim 1

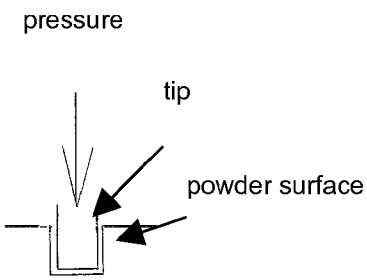
Fig. 2: Claims 10 and 13
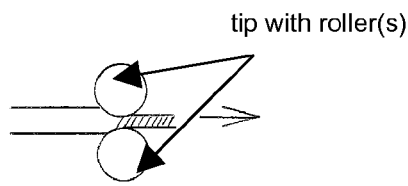
Fig. 3: Claim 11
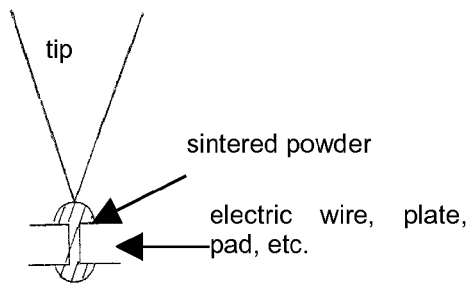
Fig. 4: Claim 14
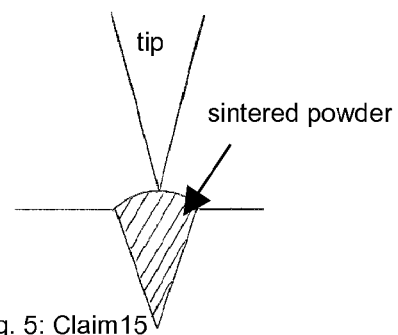
Fig. 5: Claim 15
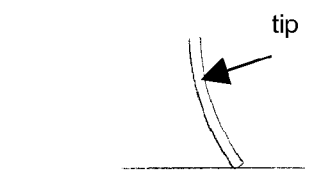
Fig. 6: Claim 17
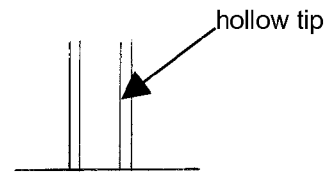
Fig. 7: Claim 18

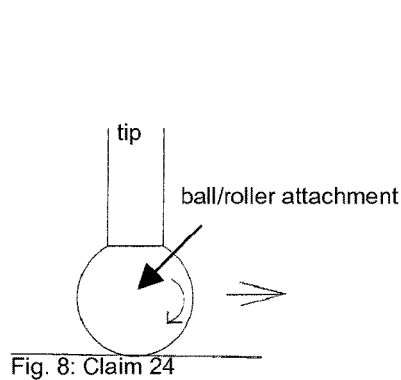
Fig. 8: Claim 24
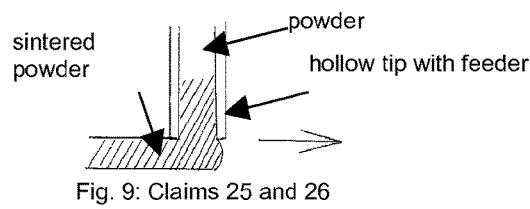
Fig. 9: Claims 25 and 26
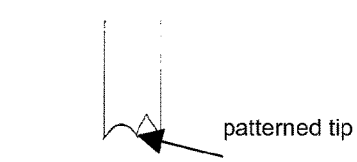
Fig. 10: Claim 19
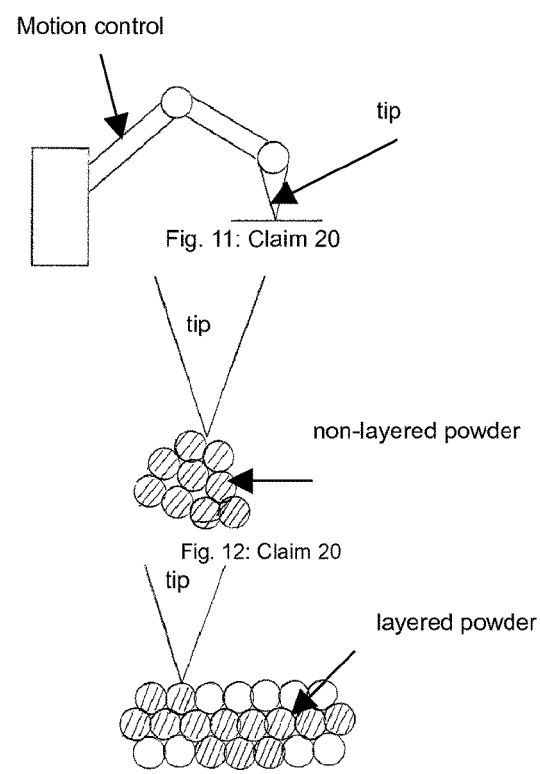
Fig. 11: Claim 20
Fig. 12: Claim 20
Fig. 13: Claims 37 and 45

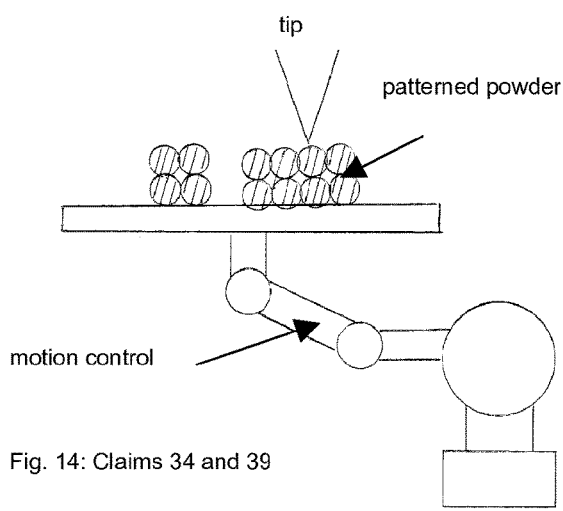
Fig. 14: Claims 34 and 39
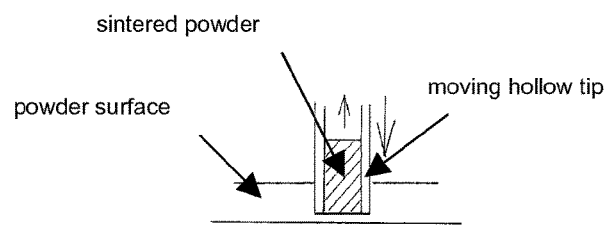
Fig. 15: Claim 12
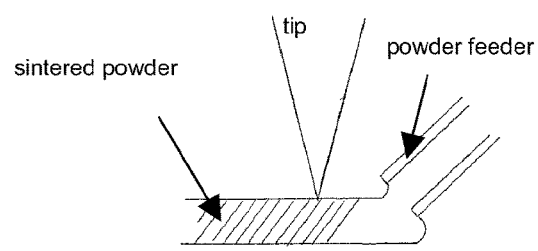
Fig. 16: Claim 41
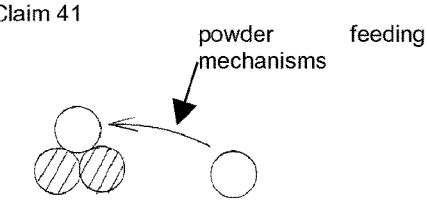
Fig. 17: Claim 40

CURRENT ACTIVATED TIP-BASED SINTERING (CATS)

CROSS REFERENCE TO RELATED APPLICATIONS

This application claims priority to, and the benefit of the filing date under 35 USC 119(e) of U.S. provisional application 61/032,068, filed 28 Feb. 2008.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

REFERENCE TO A SEQUENCE LISTING

Not applicable.

BACKGROUND

Field of the Invention

This invention relates to the sintering of powders using electric currents, and in particular to the use of electric current to fabricate 1D, 2D, or 3D components.

Background of the Invention

The sintering of powders using electric currents (namely, Spark plasma sintering (SPS)) is currently the subject of intense research and interest worldwide. SPS is now considered a major process used in the successful consolidation of numerous bulk material powder systems including nano-powders and carbon nanotube composites. However, the process can in cases set high demands for direct electric current requirements (thousands of Amps) when processing large specimens, and is usually limited to the production of bulk and simple shapes, i.e. discs/short cylinders.

U.S. Pat. No. 7,148,480 discloses a method of manufacturing optical windows for protecting infrared sensing instruments from nano-sized crystallites by compressing the crystallites into a continuous mass under high pressure in the presence of a pulsed electric current, preferably one produced by spark plasma sintering. The resulting materials have excellent optical and mechanical properties that make them favorable as replacements for the conventional single-crystal sapphire U.S. Pat. No. 7,091,136 discloses a process of forming a compound film includes formulating a nano-powder material with a controlled overall composition and including particles of one solid solution. The nano-powder material is deposited on a substrate to form a layer on the substrate, and the layer is reacted in at least one suitable atmosphere to form the compound film. The compound film may be used in fabrication of a radiation detector or solar cell.

U.S. patent publication 2006/0104885 discloses a vertical aligned nano-scale diamond structure comprising diamond nanotips or nanotubes. More particularly, apparatus and method are disclosed for depositing such diamond structure on a rugged polycrystalline substrate. The structure at least may be used as heat spreader in microelectronic devices.

U.S. patent publication 2005/0039885 discloses heat exchanger systems for use generally with electronic applications. More particularly, the present invention relates to heat exchanger bodies having oriented micro-scale channels and methods of fabricating such bodies. However, layering is achieved using the known chemical vapor deposition techniques.

U.S. patent publication 2004/0028875 discloses a method of making a product with a micro to nano sized structure using a mould having a corresponding structure at a mould surface in which a fluid containing a casting material is brought into contact with said mould surface.

BRIEF SUMMARY OF THE INVENTION

In a preferred embodiment, there is provided a process for fabricating a macro, micro or nano feature or component, comprising: providing an electrode having single or multiple tip(s), applying an electric current and/or voltage to the electrode in the presence of a single, multiple particles or powder(s), and sintering said powder under or around tip(s) to form a shape of feature or component, all conducted with/without environmental control.

In another preferred embodiment, the process further comprises wherein the process is conducted under ambient condition.

In another preferred embodiment, the process further comprises wherein the process is conducted under vacuum condition.

In another preferred embodiment, the process further comprises wherein the process is conducted under a specified temperature condition.

In another preferred embodiment, the process further comprises wherein the process is conducted under a specified reacting gas or liquid condition.

In another preferred embodiment, the process further comprises wherein the process is conducted under a specified non-reacting gas or liquid condition.

In another preferred embodiment, the process further comprises wherein the process is conducted under a specified pressure condition.

In another preferred embodiment, the process further comprises wherein the process is conducted under a composition of gases condition.

In another preferred embodiment, the process further comprises wherein the process is conducted under a composition of liquids condition In another preferred embodiment, the process further comprises wherein the sintered area is a 1D, 2D, or 3D forged feature or component.

In another preferred embodiment, the process further comprises wherein the sintered area is a 1D, 2D, or 3D rolled feature or component.

In another preferred embodiment, the process further comprises wherein the sintered area is a 1D, 2D, or 3D extruded feature or component.

In another preferred embodiment, the process further comprises wherein the sintered area is a 1D, 2D, or 3D stamped feature or component.

In another preferred embodiment, the process further comprises wherein the sintered area is a 1D, 2D, or 3D joined feature or component.

In another preferred embodiment, the process further comprises wherein the sintered area is a 1D, 2D, or 3D hole, crevasse/crack or previously chipped area.

In another preferred embodiment, the process further comprises wherein the process is modified for a rigid tip(s).

In another preferred embodiment, the process further comprises wherein the process is modified for a flexible tip(s).

In another preferred embodiment, the process further comprises wherein the process is modified for a hollow tip(s).

In another preferred embodiment, the process further comprises wherein the process is modified for a 1D, 2D, or 3D patterned tip(s).

In another preferred embodiment, the process further comprises wherein the process is modified for providing 1D, 2D, 3D, and robotic position/motion control mechanism to control the motion of a 1D, 2D, or 3D patterned tip(s).

In another preferred embodiment, the process further comprises wherein the process is modified for a moving 1D, 2D, or 3D patterned tip(s).

In another preferred embodiment, the process further comprises wherein the process is modified for a motionless 1D, 2D, or 3D patterned tip(s).

In another preferred embodiment, the process further comprises wherein the process is modified for a tip(s) with pressure condition.

In another preferred embodiment, the process further comprises wherein the process is modified for a tip(s) with roller, ball attachment.

In another preferred embodiment, the process further comprises wherein the process is modified for a tip(s) with embedded discrete feeder.

In another preferred embodiment, the process further comprises wherein the process is modified for a tip(s) with embedded continuous feeder.

In another preferred embodiment, the process further comprises wherein the process is modified for a tip(s) with no-pressure condition.

In another preferred embodiment, the process further comprises wherein the process is modified for applying an electric field to the tip(s).

In another preferred embodiment, the process further comprises wherein the process is modified for applying a wave form of electric current and/or voltage to the tip(s).

In another preferred embodiment, the process further comprises wherein the process is modified for applying a DC electric current and/or voltage to the tip(s).

In another preferred embodiment, the process further comprises wherein the process is modified for applying an AC electric current and/or voltage to the tip(s).

In another preferred embodiment, the process further comprises wherein the process is modified to allow an intensity control mechanism of electric current and/or voltage.

In another preferred embodiment, the process further comprises wherein the process is modified for a non-layered particle/powder(s).

In another preferred embodiment, the process further comprises wherein the process is modified for a 1D, 2D, or 3D patterned particle/powder(s).

In another preferred embodiment, the process further comprises wherein the process is modified for a moving particle/powder(s).

In another preferred embodiment, the process further comprises wherein the process is modified for a motionless particle/powder(s).

In another preferred embodiment, the process further comprises wherein the process is modified for a layered particle/powder(s).

In another preferred embodiment, the process further comprises wherein the process is modified for a non-patterned particle/powder(s).

In another preferred embodiment, the process further comprises wherein the process is modified for providing 1D, 2D, 3D, and robotic position/motion control mechanism to control the motion of a particle/powder(s).

In another preferred embodiment, the process further comprises wherein the process is modified for a discrete particle/powder(s) feeder.

In another preferred embodiment, the process further comprises wherein the process is modified for a continuous particle/powder(s) feeder.

In another preferred embodiment, the process further comprises wherein the process is modified for a particle/powder(s) with pressure condition.

In another preferred embodiment, the process further comprises wherein the process is modified for a particle/powder(s) with no-pressure condition.

In another preferred embodiment, the process further comprises wherein the particle/powder(s) is made from a material selected from the group consisting of metals, alloys, composites, ceramics, carbon materials, semiconductors, superconductors, reactive systems, polymers, intermetallics, glass, metallic glasses, porous materials, smart materials, functionally graded materials, hierarchical materials, biocompatible materials and combinations thereof In another preferred embodiment, the process further comprises wherein the process is modified for a sequentially layered particle/powder(s).

In another preferred embodiment, the process further comprises wherein the process is modified for a mixture particle/powder(s) with gas(es).

In another preferred embodiment, the process further comprises wherein the process is modified for a mixture particle/powder(s) with liquid(s)

BRIEF DESCRIPTION OF THE DRAWINGS

FIG. 1 is a graphic illustration of an embodiment of the Current-Activated Tip-Based Sintering (CATS) Process. This figure is one example showing the use of a nanotip to process nano-components.

FIG. 2 is a graphic illustration of the process showing wherein the sintered area is a 1D, 2D, or 3D, forged or stamped, feature or component.

FIG. 3 is a graphic illustration of the process showing wherein the sintered area is a 1D, 2D, or 3D rolled feature or component.

FIG. 4 is a graphic illustration of the process showing wherein the sintered area is a 1D, 2D, or 3D joined feature or component.

FIG. 5 is a graphic illustration of the process showing wherein the sintered area is a 1D, 2D, or 3D filled hole or crevasse.

FIG. 6 is a graphic illustration of the process showing wherein the process is modified for a flexible tip(s).

FIG. 7 is a graphic illustration of the process showing wherein the process is modified for a hollow tip(s).

FIG. 8 is a graphic illustration of the process showing wherein the process is modified for a tip(s) with roller, ball attachment.

FIG. 9 is a graphic illustration of the process showing wherein the process is modified for a tip(s) with embedded discrete feeder, or an embedded continuous feeder.

FIG. 10 is a graphic illustration of the process showing wherein process is modified for a 1D, 2D, or 3D patterned tip(s).

FIG. 11 and FIG. 12 are graphic illustrations of the process showing wherein the process is modified for providing 1D, 2D, 3D, and robotic position/motion control mechanism to control the motion of a 1D, 2D, or 3D patterned tip(s).

FIG. 13 is a graphic illustration of the process showing wherein the process is modified for a layered particle/powder(s), or the process is modified for a sequentially layered particle/powder(s).

FIG. 14 is a graphic illustration of the process showing wherein the process is modified for a 1D, 2D, or 3D patterned particle/powder(s), or is modified for providing 1D, 2D, 3D, and robotic position/motion control mechanism to control the motion of a particle/powder(s).

FIG. 15 is a graphic illustration of the process showing wherein the sintered area is a 1D, 2D, or 3D extruded feature or component.

FIG. 16 is a graphic illustration of the process showing wherein the process is modified for a continuous particle/powder(s) feeder.

FIG. 17 is a graphic illustration of the process showing wherein the process is modified for a discrete particle/powder(s) feeder.

DETAILED DESCRIPTION OF THE INVENTION

Definitions

The following definitions are provided as an aid to understanding the detailed description of the present invention.

As defined in the art, submicron powders are materials having average grain size below 1 micrometer. Of critical interest for this invention are nanoscale powders and nanostructured layers of ceramics to fabricate 1D, 2D, or 3D components. Nanoscale powders (nanopowders) are submicron powders with average grain size less than 100 nanometers (preferably with a standard deviation of less than 25 nm) and with a significant fraction of interfacial atoms. Accordingly, reference to nanoscale powders in this disclosure is intended to refer to powders with those characteristics, but it is understood that the critical length for a given property of a material may be smaller or larger, depending on the property of interest, although such length is always submicron.

Submicron layers are layers having thickness less than 1 micrometer. Of particular interest to this invention are nanostructured layers which are defined specifically as layers with thickness, or microstructure, or both, confined to a size less than property confinement size (positively less than 1 micron, preferably below 100 nm). Accordingly, reference to nanostructured layers in this disclosure is intended to refer to layers with those characteristics.

The sintering of nanopowders using electric currents, namely, Spark Plasma Sintering (SPS) is currently the subject of intense research and interest worldwide. SPS is now considered a major process used in the successful consolidation of numerous bulk material powder systems including nanopowders and carbon nanotube composites. However, the process can in cases set high demands for direct electric current requirements (thousands of Amps) when processing large specimens, and is usually limited to the production of bulk and simple shapes, i.e. discs/short cylinders.

The use of electric current to fabricate layered, 1D, 2D, or 3D components (e.g. micro and nano components) from nano or micro-sized powders has not yet been effectively addressed Accordingly, the invention provides a method of addressing one or more problems in the prior art. The idea can be extended to 3D layered-fabrication when sequential layers of nano-sized or micro-sized powders are deposited in-situ following each sintering path. The process can fabricate physical objects (i.e. ID, 2D and 3D micro and nano-components) directly from CAD data sources.

The pressure can be applied to the powder through the micro/nano-scale electrode tip to enforce SPS conditions on the micro/nano-scale. Moreover, for nanofabrication purposes, where nano-sized components are processed, the amount of current needed to generate the required current densities for sintering will be relatively small.

The process can be applicable for a wide range of materials including metals, alloys, ceramics, carbon-nanotubes, etc. For sintering nano and micro-ceramic components, the choice of the electrode material can allow joule heating of the electrode material which in turn conducts heat to the layer of ceramic being sintered to enforce local SPS conditions. (5) The process also has the advantage of using powders, which in turn will allow the manufacturing of nano and micro components which can be of controlled porosity and even composite nano and micro-components can be manufactured from one or more materials.

The invention will be useful for manufacturing of various products including: (1) rapid prototyping (resembling the laser sintering approach for rapid prototyping but with a higher density); (2) micro/nano-scale alloy and ceramic products including quantum dots, nanowires, nanotubes, etc.

Additional products which are contemplated as within the scope of the invention where the product is made using the inventive subject matter, include electronics such as capacitors, varistors, resistors, inductors, and EMI filters, and MEMS devices such as pressure sensors, accelerometers, piezoelectrics, visual displays, optical switches, biosensors, chemosensors, and the like.

The Spark Plasma Sintering (SPS) process involves the passage of pulsed high electric current through a powder/die arrangement, while the powder is subjected to an applied pressure. The current heats the arrangement predominantly by Joule heating. Remarkable advantages of the process include; the ability to sinter nanopowders (and retain the nanostructure) at significantly lower temperatures, in significantly shorter times while using much higher heating rates than conventionally possible. Phase transformation kinetics have also been reported to be as high as 40 times quicker than by using conventional heating at the same temperature, owing to an intrinsic effect of current.

The invention is a process for fabricating a macro, micro or nano feature or component with 1D, 2D, or 3D shape, comprising: providing an electrode having single or multiple tip(s), applying an electric current and/or voltage to the electrode in the presence of a single, multiple particles or powder(s), and sintering said powder under or around tip(s) to form a shape of feature or component, all conducted with or without environmental control.

The tip can be macro-scale, micro-scale or nano-scale. It can be flexible or rigid, solid or hollow or perforated. Moreover the tip can be of any shape, it can be used in a stationary position or move in any direction following unlimited geometrical motion. Pressure can be applied or not, this can be on the tip or using atmospheric pressure control. The tip and system have many degrees of motion including X-Y-Z movement and robot manipulator type movement, and positioning control. Current or voltage can be applied to activate the sintering process. Electric current (alternating current (AC), direct current (DC), pulsed DC and field current and/or voltage) can be applied, with intensity/voltage control. As one example of the process approaches, if one considers layer(s) of deposited nanopowders, both the electric current and the pressure can be applied to the powder through the tip of an electrode (e.g. nano-scale tip) (FIG. 1) to enforce local SPS conditions and therefore sintering. Both the shape and size of the sintered regions of powders can then be controlled for example by controlling the electrode tip position and path [hence very articulate and complex shapes and features (from the macro-scale down to the nano-scale)] can be processed. For example, manufacturing functional matrices of different materials at multiple scales. Sintering can be achieved for layered or non layered powders. Powders can be patterned in 1D, 2D and 3D structures, or non patterned. The inventors have named this process "Current-Activated Tip-Based Sintering (CATS)". The idea can be extended to 3D fabrication, for example, when sequential layers of powder (s) are deposited in-situ following each sintering path, and subsequently sintered; in order to build a 3D sintered nano-part (can also be micro-part or macro part, depending on the type of tip and size of powders used). In addition, depending on the system design (for example substrate and tip material) very high pressures compared to SPS can be applied if needed, which will have the effect of allowing ultra rapid sintering and therefore ultra rapid manufacturing.

For example, if one considers layer(s) of deposited nanopowders, both the electric current and the pressure can be applied to the powder through the tip of an electrode (e.g. nanotip) (FIG. 1) to enforce local SPS conditions and therefore sintering.

The environment can play a critical or no critical role depending on the sintering needed. Enviromental temperature can be controlled (including the heating of the powder or powder bed apart from the heating generated from the tip), so can the pressure.

In some systems environmental control will not be used. However in other cases, environmental control (using vacuum, gas(es) or liquid(s)) will be used. An example of environmental control is the use of inert gas atmosphere, to protect the tip and system from oxidation or other reactions. In other cases gaseous mixtures may be controlled in terms of composition (so can liquid mixtures), pressure and temperature to promote a reaction beneath or around the tip during sintering or away from it. Of course tip selection will be important to avoid damage of the tip during operation. One example of this is if the gas(s) reacts with the powder beneath the tip during the sintering operation to form certain compounds. Non reacting gasses or liquids may also be used. For example, even inert gas pressure can be used or varied at certain stages of the CATS process, for example to promote better sintering. Vacuum can also be used instead, two examples of its benefits include tip protection and enhanced sintering, since it is well known that sintering in vacuum promotes products with high densities. In other instances we may need to generate porous macro-, micro-, or nano- features and components. In this case strategies for making porous materials will be used, for example stopping the sintering process before it is complete, or adding particles or fibres or other shapes in the powder mix that would be a sacrificial place holder, leaving behind porous geometries.

The tip shape is also a variable, for example the tip could have a shape such as the letter C (engraved or embossed), and when applied to the powder, it should generate a correspondingly similar sintered shape. The function of the tip is another important matter. The tip can simply contact the powder, or increased pressures be applied. In this case we have a pressing operation during sintering. It is understood that the tip can act to forge, extrude, roll, stamp, draw and join. For example a hollow designed tip can apply current and heat powders beneath it and then through pressure application the powders would extrude through an indirect type extrusion operation into the hole. Other permutations and variations to this idea are contemplated herein with multiholes, different shape hole, mandrel type designs to allow hollow extrusions . . . etc. In a similar way a tip with a roller can provide both heating/sintering through electric current and rolling consolidation action. Stamping can also be applied, in addition to joining.

The tip can also have an extra function that is the delivery of powder (s), (intermittently or continuously), gas(es) or liquids, through for example a hollow cavity within the tip. Multiple tips can also be used for increased production rates or providing separate functions. Hole or crack/crevice filling with powders is also possible followed by tip sintering. This process can be used for filling material craters or chips followed by subsequent tip sintering. This is important for repair operations. The powder may or may not be of the same material being repaired.

The process should be applicable to a wide range of materials including metals, alloys, composites, ceramics, carbon materials, semiconductors, superconductors, reactive systems, polymers, intermetallics, glass, metallic glasses, porous materials, smart materials, functionally graded materials, hierarchical materials, biocompatible materials and combinations thereof. Some of those could be formed via reaction with gas(es) or liquids.

Both the shape and size of the sintered regions of powders can then be controlled by controlling the electrode tip position and path. Hence very articulate and complex shapes and features, from the macro-scale down to the nano-scale, can be processed, and physical objects can be fabricated directly from Computer Aided Design (CAD) sources. In addition, the tips may also be used in a stationery mode when an impression is or is not places on its contacting surface. This can allow sintering of features under the impression/tip (i.e. imprint sintered features). Also, if a through-hole is placed in the tip, when the tip contacts the surface and with the application of pressure, back extrusion into the tiptip hole is possible therefore can be used to produces either micro or nano wires and possibly micro/nano tubes, depending on the design of the hole. It is understood that multiple tips can also be used simultaneously (either stationery or in travel mode) to increase productivity rate. An important feature is also that the tip may also be used to in-situ characterize the sintered features, to produce visual images and property spatial maps without removing the specimens. Once features have been sintered they can either be left as is, or if needed to, be removed. Removal processes can be used for example, using designed enchants or if particles are magnetic then and on/off magnetic feature can allow sintering and subsequent release of features.

Using the invented process, high-density or low density physical objects can be formed at significantly lower temperatures, in significantly shorter times. The sintering process can also be controlled to form porous objects with controlled porosity levels, for example porous nanowires. A wide range of powdered materials can be used in the invented process including numerous ceramics, metals, shape memory alloys . . . etc. Applicants have coined the term for this process "Current-Activated Tip-Based Sintering (CATS). This CATS process can be used to replace conventional soldering operations by joining electronic components together without using solder materials.

The idea can be extended to 3D nano-fabrication, for example, when sequential layers of nanopowders are deposited in-situ following each sintering path, and subsequently sintered. In order to build a 3D sintered nano-part, micro-part, or macro part, the user need only vary the type of tip and size of powders used.

In addition, depending on the system design, for example substrate and tip material, very high pressures compared to SPS can be applied through the tip, which will have the effect of allowing ultra rapid sintering and therefore manufacturing.

As mentioned the vast majority of attention is on the SPS of bulk and relatively large powder mass, using a die/punch arrangement. The shift to 1D, 2D, or 3D layered powders requiring an SPS automation with position and path control is not expected, since it requires consideration and knowledge of electrode tip design and material selection and knowledge of micro and nano tip design and modification to allow passage of current, high levels of pressure if needed, and precision control of the path and position of the nano or micro electrode tip. This is therefore a cross- disciplinary invention.

The invented process can also fabricate physical objects directly from Computer Aided Design (CAD) data sources. Again, the CAD process uses an electrode tip and a means to control the position and the path of the tip with a high current to activate nano or micro powder sintering process in layers to form 1D, 2D, or 3D objects.

It is also contemplated that the inventive subject matter can be combined with existing nanotechnology manufacturing technologies such as solution deposition, vapor deposition, and so forth.

REFERENCES

K. Morsi, V. V. Patel, K. S. Moon, J. E. Garay, J. Mater. Sci. 43 (2008) 12.
V. Mamedov, Powder Metall. 45 (4) (2002) 322-328
M. Nygren, Z. Shen, Spark plasma sintering: possibilities and limitations, in: Key Engineering Materials, pp. 264-268, Euro Ceramics VIII (2004) 719-724
U. Anselmi-Tamburini, J. E. Garay, Z. A. Munir, A. Tacca, F. Maglia, G. Spinolo, J. Mater. Res. 19 (2004) 3225
R. Chaim, Mater. Sci. Eng. A A443 (2007) 25-32
Z. A. Munir, U. Anselmi-Tamburini, M. Ohyanagi, J Mater. Sci. 41 (2006) 763-777
H. B. Huntington, Diffusion in Solids, Academic Press, New York, 1975, p. 306
K. Morsi et al., Scripta Mater. (2009), doi:10.1016/j.scriptamat.2008.12.049

The references recited herein are incorporated herein in their entirety, particularly K. Morsi et al., Scripta Mater. (2009), doi:10.1016/j.scriptamat.2008.12.049, text and figures, and any others as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A process for fabricating a sintered component, comprising:
   providing an electrode having a sintering tip, said sintering tip connected to a motion controller to control three-dimensional (3D) motion of the sintering tip, said sintering tip connected to a source of electric current or voltage having an intensity controller, said sintering tip is nano-scale wherein nano-scale is less than 100 nanometers, said sintering tip configured to apply pressure;
   applying an electric current and/or voltage to the electrode in the presence of a powder; and
   sintering said powder under or around said sintering tip to form a sintered component.

2. The process of claim 1, comprising wherein the process is conducted under ambient condition.

3. The process of claim 1, comprising wherein the process is conducted under vacuum condition.

4. The process of claim 1, comprising the step of applying an electric field to the sintering tip.

5. The process of claim 1, comprising the step of applying a wave form of electric current and/or voltage to the sintering tip.

6. The process of claim 1, comprising the step of applying a DC electric current and/or voltage to the sintering tip.

7. The process of claim 1, comprising the step of applying an AC electric current and/or voltage to the sintering tip.

8. The process of claim 1, comprising wherein the powder is a layered powder.

9. The process of claim 8, comprising wherein the powder is a sequentially layered powder.

10. The process of claim 1, comprising wherein the powder is a mixture powder with gas(es).

11. The process of claim 1, comprising wherein the powder is a mixture powder with liquid(s).

12. The process of claim 1, comprising wherein the powder is a powder with pressure condition or a powder with a no-pressure condition.

13. The process of claim 1, wherein the powder is made from a material selected from the group consisting of metals, alloys, composites, ceramics, semiconductors, superconductors, polymers, intermetallics, glass, metallic glasses, porous materials, smart materials, functionally graded materials, biocompatible materials and combinations thereof.

14. The process of claim 1, wherein sintering said powder forms a sintered area on a forged component, a rolled component, an extruded component, a stamped component, a joined component, a crevasse/crack, or a previously chipped area.

* * * * *